Figure 1:
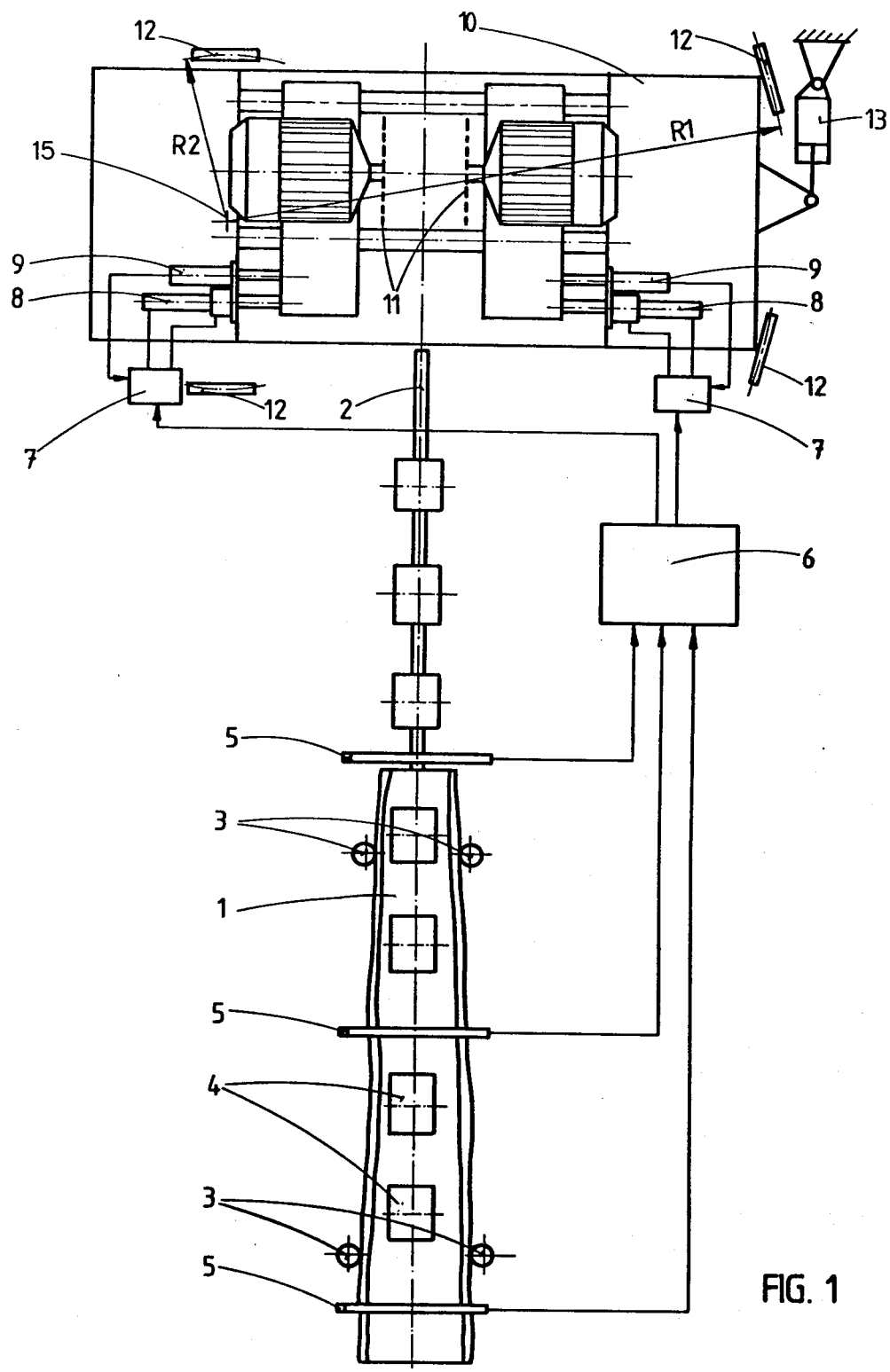

United States Patent [19]

Mäkelä et al.

[11] 4,449,557
[45] May 22, 1984

[54] METHOD AND APPARATUS FOR SAWING A PIECE OF TIMBER

[75] Inventors: Olavi Mäkelä, Karhula; Ossi Suntio, Neuvoton; Jorma Tuomaala, Karhula, all of Finland

[73] Assignee: A. Ahlstrom Osakeyhtio, Noormarkku, Finland

[21] Appl. No.: 383,572

[22] Filed: Jun. 1, 1982

[30] Foreign Application Priority Data

Jun. 12, 1981 [FI] Finland ............................. 811830

[51] Int. Cl.³ ............................................. B27B 1/00
[52] U.S. Cl. ...................................... 144/357; 83/368; 83/425.3; 83/409; 144/378
[58] Field of Search .................. 83/71, 365, 368, 370, 83/371, 425.2, 425.3, 409, 404.1; 144/114 R, 116, 117 B, 39, 41, 162 R, 357, 378; 409/80, 132, 188

[56] References Cited

U.S. PATENT DOCUMENTS

4,239,072 12/1980 Merilainen ......................... 144/357
4,373,563 2/1983 Kenyon ............................... 144/357

*Primary Examiner*—W. D. Bray
*Attorney, Agent, or Firm*—Bucknam and Archer

[57] ABSTRACT

A method and an apparatus for sawing a piece of timber and particularly for edging a board. The piece of timber is brought to pass in its longitudinal direction through a measuring station and further, maintaining its position, to a sawing machine. The optimum width and sawing direction are determined by the measuring data obtained by means of measuring gates collected in the memory of a computer. The computer controls the sawing blades. The blades of the sawing machine are turned to take the desired sawing direction and are moved at an even speed in lateral direction during the sawing process. The apparatus comprises a conveyor for transferring the log of timber, a plurality of gates for measuring the optimum width and direction, a computer for collecting the data. The computer controls the blades so that during sawing, the sawing lines coincide with the edge lines of the calculated optimum board. The sawing machine is mounted on vibration dampers which act as springs. The dampers are mounted in the corners of the sawing machine in such positions that the stiff direction of the damper is directed towards the required turning point and the flexible direction coincides with the periphery of circles having radius $R_1$ and $R_2$ drawn around the pivot axis.

4 Claims, 3 Drawing Figures

METHOD AND APPARATUS FOR SAWING A PIECE OF TIMBER

The present invention relates to a method and an apparatus for sawing a piece of timber, particularly edging a board, where the timber is measured while transferring it in its longitudinal direction towards the edger and the sawing direction and width of the timber are determined by the measuring data received.

Automatic edger optimizers generally utilize a two-line system: the measuring is carried out beside the edging line and the optimum position of the board is determined on the measuring line or while moving the board to the feed line. Position errors of the board arise when setting the optimum position, moving the board and accelerating it to the edging speed, whereby the guiding member slides on the surface of the board.

In the so-called gate measuring system the board is measured while it passes a measuring gate or gates on the edging line. The advantage of this method compared to the two-line system is its simple measuring movement and mechanics and the unchanged position of the board after the measurement. Optimizing the position of the board in motion or arresting it for optimizing is, however, inaccurate and takes time.

The object of the invention is to provide a method by which it is possible to saw an optimum board of a board with two unfinished sides without stopping it or changing its position in relation to the feed line.

In an automatic edging method disclosed by the U.S. Pat. No. 4,239,072 a board having two unfinished sides is cenetered in the feed line at two points and, if necessary, the board is edged in a direction lateral to the feed line by moving at an even speed the discs of the chipper edger in lateral direction during the edging. By a chipping edger this is made possible by inclining the discs in relation to each other.

The present invention enables sawing blades to be used in edging to separate the edgings from the board having two unfinished sides or to split the board after edging.

Figure 2:
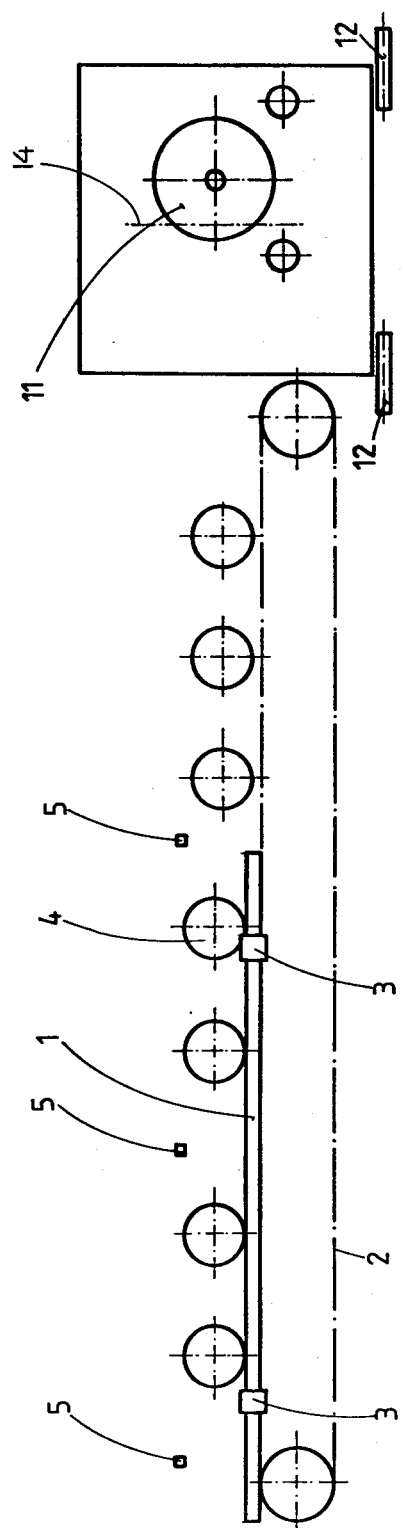

It is a characteristic feature of the invention that the sawing blades of the sawing machine are turned in order to set them in the sawing direction and further that the blades are moved laterally in relation to the feed direction during sawing. The blades are best brought into the correct position by pivoting the edger. The pivot axis should be chosen so as to make the blades keep their cutting positions in lateral direction as unchanged as possible despite the pivoting angle. This is achieved by setting the pivot axis in a line which is transverse to the feed line and passes through the sawing points. The pivot axis is also transverse to the sawing line but can run beside it. The pivotal axis is line 14 in FIG. 2. The pivotal axis goes through the common pivotal point 15 of the flexible vibration dampers. When the sawing discs are in a vertical position as shown in FIGS. 1 and 2, the pivotal axis must be vertical in order to maintain this position.

The sawing machine is pivoted e.g. by a hydraulic cylinder provided with setting devices. The length of the cylinder is changed in relation to the speed of the lateral movement of the blades. If the feed speed of the board is variable it must be payed attention to when determining the cylinder setting length.

A cylinder provided with a setting device is expensive. It can be substituted for by an ordinary cylinder provided with a counter spring if the pivoting movement of the sawing machine is rendered adequately easy. Then the turning angle is proportional to oil pressure.

The easiness of the pivoting movement and the return force proportional to the turning angle are achieved by mounting the sawing machine on flexible vibration dampers. The dampers are provided with springs which are stiff in one direction and mounted in the corners of the sawing machine in such positions that the stiff direction is directed towards the required turning point and the flexible direction coincides with the periphery of a circle around the pivot axis.

Figure 3:
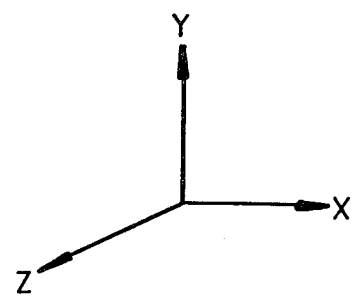
Figure 3:
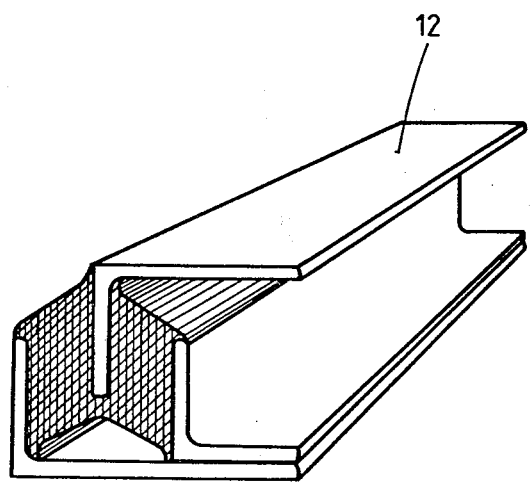

The invention is described in more detail with reference to the enclosed drawings where FIG. 1 is a top view of an apparatus embodying the method of the invention, FIG. 2 is a side elevational view of the apparatus, and FIG. 3 is a perspective view of a detail of the apparatus according to the invention.

In the drawings the numeral 1 refers to a board to be edged lying on a conveyor 2. The board is centered symmetrically in relation to the feed line by two pairs of centering rolls 3. The centering rolls are detached and press rolls 4 are used to press the board against the chain of the conveyor. When the board starts to move measuring is started in measuring gates 5. The measuring data is collected in the memory of a computer 6. When the board has travelled the distance between the measuring gates it has been measured along its whole length and by the data received from the measurements the computer calculates the optimum width and direction of the board. Then the computer controls through automatic valves 7, hydraulic cylinders 8 and a potentiometer 9, by known methods, the sawing two discs 11 of the edger 10 into the initial position and turns the edger supported by the flexible vibration dampers 12 presented in FIG. 3, with a cylinder 13 connected to the edger so as to set the discs in the sawing direction.

In FIG. 3 the damper is stiff in the direction of the axis x and flexible in the direction of the axes y and z.

During sawing the computer changes evenly the commands so that the sawing lines coincide with the edge lines of the calculated optimum board while the board travels at an even speed through the edger.

The edger must be located at such a distance from the measuring gate or gates that the time reserved for processing the measuring data and controlling the discs to the initial position is sufficient.

The springs used are made of spring profile which is cut in appropriate pieces. They are stiff in lateral direction and are mounted in pairs in circles having a radius of R1 and R2, drawn around the pivoting point.

The scope of the invention is not limited by the presented embodiment but covers also other applications and modifications which are within the concept of the invention. E.g. it is not necessary to use the board centering device presented in FIGS. 1 and 2, the boards may only approximately align with the feed line.

What we claim is:

1. An apparatus for sawing and edging a board which has two unfinished sides which comprises means for centering the board symmetrically in relation to a feed line, means for measuring the optimum sawing direction and width of the board, a sawing machine for edging the sides of the board and for sawing the board, the sawing machine comprising blades, a cylinder connected to said sawing machine, the sawing machine being pivotally mounted upon said cylinder, said cylinder carrying out a pivotal movement around a pivot axis which is in a line transverse to the feed line passing through the sawing points.

2. An apparatus according to claim 1 wherein said sawing machine is mounted on vibration dampers which are mounted in the corners of the sawing machine, the vibration dampers being stiff in one direction and being flexible in the direction which coincides with the periphery of a circle around the pivot axis.

3. The apparatus according to claim 1 wherein the sawing machine comprises a pair of vertical sawing discs and the pivot axis is vertical.

4. The method of sawing and edging a board which has two unfinished sides which consists of:
(1) centering the board symmetrically in relation to the feed line;
(2) determining the optimum width and direction of the board by means of a plurality of gates;
(3) transferring the board though an edger comprising sawing blades which move laterally in relation to the feed direction;
(4) pivoting the edger around a vertical pivot axis which is transverse to the feed line and passes through the sawing points;
(5) turning the blades in relation to the feed direction so as to set them in the sawing direction.

* * * * *